United States Patent
Williams

(10) Patent No.: US 10,139,649 B2
(45) Date of Patent: Nov. 27, 2018

(54) EYEWEAR RETENTION DEVICE

(71) Applicant: CABLZ, INC., Birmingham, AL (US)

(72) Inventor: Ronald Wade Williams, Birmingham, AL (US)

(73) Assignee: CABLZ, INC., Birmingham, AL (US)

( * ) Notice: Subject to any disclaimer, the term of this patent is extended or adjusted under 35 U.S.C. 154(b) by 245 days.

(21) Appl. No.: 14/307,122

(22) Filed: Jun. 17, 2014

(65) Prior Publication Data

US 2015/0103308 A1    Apr. 16, 2015

Related U.S. Application Data

(63) Continuation of application No. 13/346,492, filed on Jan. 9, 2012, which is a continuation of application No. 12/640,872, filed on Dec. 17, 2009, now Pat. No. 8,092,009, which is a continuation of application No. 29/336,727, filed on May 7, 2009, now abandoned, said application No. 13/346,492 is a continuation of application No. 12/991,668, filed as application No. PCT/US2009/043156 on May 7, 2009, now Pat. No. 8,366,268, which is a continuation of application No. 12/142,323, filed on Jun. 19, 2008, now Pat. No. 7,467,867.

(60) Provisional application No. 61/051,539, filed on May 8, 2008.

(51) Int. Cl.
  *G02C 3/00* (2006.01)
(52) U.S. Cl.
  CPC ............ *G02C 3/006* (2013.01); *G02C 3/003* (2013.01); *G02C 2200/20* (2013.01)

(58) Field of Classification Search
  CPC .......... G02C 3/003; G02C 3/006; G02C 3/00
  USPC ................. 351/156, 157, 158, 41, 122, 123; D16/339
  See application file for complete search history.

(56) References Cited

U.S. PATENT DOCUMENTS

| | | |
|---|---|---|
| 1,819,738 A | 8/1931 | Ludlow |
| 2,704,961 A | 3/1955 | Weil |
| 3,450,467 A | 6/1969 | Phillips |
| 4,133,604 A | 1/1979 | Fuller |
| 5,092,668 A | 3/1992 | Welch |
| 5,575,042 A | 11/1996 | Kalbach |
| 5,664,291 A | 9/1997 | Stoller |
| 6,053,612 A | 4/2000 | Macintosh |
| 6,644,808 B1 | 11/2003 | Liu |

(Continued)

FOREIGN PATENT DOCUMENTS

JP    2001-209014    8/2001

OTHER PUBLICATIONS

First Package Jul. 2008.

(Continued)

*Primary Examiner* — Hung Dang
(74) *Attorney, Agent, or Firm* — C. Brandon Browning; Maynard, Cooper & Gale, PC

(57) ABSTRACT

An eyewear retention device that comprises two temple retainers connected by a resilient cable, such that when the temple retainers are attached to a pair of eyeglasses and the eyeglasses are worn over the ears of a wearer, the resilient cable extends rearward from the head of the wearer and is suspended off the neck of the wearer. The resilient cable may be tightly wound metal with a smooth plastic outer sheath.

7 Claims, 6 Drawing Sheets

(56) References Cited

U.S. PATENT DOCUMENTS

| | | | |
|---|---|---|---|
| 6,764,177 B1 † | 7/2004 | Chisolm | |
| 6,941,619 B2 | 9/2005 | MacKay | |
| 7,284,855 B2 * | 10/2007 | Bent | G02C 3/003 351/156 |
| 7,467,867 B1 | 12/2008 | Williams | |
| D607,919 S | 1/2010 | Williams | |
| 7,884,855 B2 | 2/2011 | Ortiz | |
| 8,092,009 B2 | 1/2012 | Williams | |
| 8,366,268 B2 | 2/2013 | Williams | |
| 2007/0046889 A1 | 3/2007 | Miller | |

OTHER PUBLICATIONS

Yellow Mannequin Jul. 2008.
Product Flyer Jul. 2008.
Second Package Dec. 2008.
Jan. 2009 Show Literature.
First Brochure 2009.
Third Package Apr. 2009.
US Trademark application No. 77171760.
Masahi, Honda "International Preliminary Report on Patentability (for PCT/US09/43156)," International Bureau of WIPO, dated Nov. 9, 2010.
Bird, Joseph S. III "Patent Owner's Preliminary Response to Petition Under 35 U.S.C. 313 and 37 CFR 42.107" United States Patent and Trademark Office/Before the Patent Trial and Appeal Board/*Chums, Inc., and Croakies, Inc.*, Petitioners v. *CABLZ, Inc.* Patent Owner/IPR 2014-01240 U.S. Pat. No. 8,366,268 Issue Date: Feb. 5, 2013 Title: Eye Wear Retention Device; Paper No. 8; Dec. 18, 2014, pp. 1-69.
Bird, Joseph S. III "Patent Owner's Preliminary Response to Petition Under 35 U.S.C. 313 and 37 CFR 42.107—Exhibit 2023" United States Patent and Trademark Office/Before the Patent Trial and Appeal Board/*Chums, Inc., and Croakies, Inc.*, Petitioners v. *CABLZ, Inc.* Patent Owner/IPR 2014-01240 U.S. Pat. No. 8,366,268 Issue Date: Feb. 5, 2013 Title: Eye Wear Retention Device; Dec. 18, 2014, pp. 1-2.
Bird, Joseph S. III "Patent Owner's Preliminary Response to Petition Under 35 U.S.C. 313 and 37 CFR 42.107—Exhibit 2024" United States Patent and Trademark Office/Before the Patent Trial and Appeal Board/*Chums, Inc., and Croakies, Inc.*, Petitioners v. *CABLZ, Inc.* Patent Owner/IPR 2014-01240 U.S. Pat. No. 8,366,268 Issue Date: Feb. 5, 2013 Title: Eye Wear Retention Device; Dec. 18, 2014, pp. 1-49.
Bird, Joseph S. III "Patent Owner's Preliminary Response to Petition Under 35 U.S.C. 313 and 37 CFR 42.107—Exhibit 2043" United States Patent and Trademark Office/Before the Patent Trial and Appeal Board/*Chums, Inc., and Croakies, Inc.*, Petitioners v. *CABLZ, Inc.* Patent Owner/IPR 2014-01240 U.S. Pat. No. 8,366,268 Issue Date: Feb. 5, 2013 Title: Eye Wear Retention Device; Dec. 18, 2014, pp. 1-4.
Bird, Joseph S. III "Patent Owner's Preliminary Response to Petition Under 35 U.S.C. 313 and 37 CFR 42.107—Exhibit 2044" United States Patent and Trademark Office/Before the Patent Trial and Appeal Board/ *Chums, Inc., and Croakies, Inc.*, Petitioners v. *CABLZ, Inc.* Patent Owner/IPR 2014-01240 U.S. Pat. No. 8,366,268 Issue Date: Feb. 5, 2013 Title: Eye Wear Retention Device; Dec. 18, 2014, pp. 1-6.
Bird, Joseph S. III "Patent Owner's Preliminary Response to Petition Under 35 U.S.C. 313 and 37 CFR 42.107—Exhibit 2045" United States Patent and Trademark Office/Before the Patent Trial and Appeal Board/*Chums, Inc., and Croakies, Inc.*, Petitioners v. *CABLZ, Inc.* Patent Owner/IPR 2014-01240 U.S. Pat. No. 8,366,268 Issue Date: Feb. 5, 2013 Title: Eye Wear Retention Device; Dec. 18, 2014, pp. 1-3.
Bird, Joseph S. III "Patent Owner's Preliminary Response to Petition Under 35 U.S.C. 313 and 37 CFR 42.107—Exhibit 2046" United States Patent and Trademark Office/Before the Patent Trial and Appeal Board/ *Chums, Inc., and Croakies, Inc.*, Petitioners v. *CABLZ, Inc.* Patent Owner/IPR 2014-01240 U.S. Pat. No. 8,366,268 Issue Date: Feb. 5, 2013 Title: Eye Wear Retention Device; Dec. 18, 2014, p. 1.
Bird, Joseph S. III "Patent Owner's Preliminary Response to Petition Under 35 U.S.C. 313 and 37 CFR 42.107—Exhibit 2047" United States Patent and Trademark Office/Before the Patent Trial and Appeal Board/ *Chums, Inc., and Croakies, Inc.*, Petitioners v. *CABLZ, Inc.* Patent Owner/IPR 2014-01240 U.S. Pat. No. 8,366,268 Issue Date: Feb. 5, 2013 Title: Eye Wear Retention Device; Dec. 18, 2014, pp. 1-17.
Bird, Joseph S. III "Patent Owner's Preliminary Response to Petition Under 35 U.S.C. 313 and 37 CFR 42.107—Exhibit 2048" United States Patent and Trademark Office/Before the Patent Trial and Appeal Board/ *Chums, Inc., and Croakies, Inc.*, Petitioners v. *CABLZ, Inc.* Patent Owner/IPR 2014-01240 U.S. Pat. No. 8,366,268 Issue Date: Feb. 5, 2013 Title: Eye Wear Retention Device; Dec. 18, 2014, pp. 1-35.
Bird, Joseph S. III "Patent Owner's Preliminary Response to Petition Under 35 U.S.C. 313 and 37 CFR 42.107—Exhibit 2049" United States Patent and Trademark Office/Before the Patent Trial and Appeal Board/ *Chums, Inc., and Croakies, Inc.*, Petitioners v. *CABLZ, Inc.* Patent Owner/IPR 2014-01240 U.S. Pat. No. 8,366,268 Issue Date: Feb. 5, 2013 Title: Eye Wear Retention Device; Dec. 18, 2014, pp. 1-36.
Bird, Joseph S. III "Patent Owner's Preliminary Response to Petition Under 35 U.S.C. 313 and 37 CFR 42.107—Exhibit 2050" United States Patent and Trademark Office/Before the Patent Trial and Appeal Board/*Chums, Inc., and Croakies, Inc.*, Petitioners v. *CABLZ, Inc.* Patent Owner/IPR 2014-01240 U.S. Pat. No. 8,366,268 Issue Date: Feb. 5, 2013 Title: Eye Wear Retention Device; Dec. 18, 2014, p. 1.
Bird, Joseph S. III "Patent Owner's Preliminary Response to Petition Under 35 U.S.C. 313 and 37 CFR 42.107—Exhibit 2051" United States Patent and Trademark Office/Before the Patent Trial and Appeal Board/ *Chums, Inc., and Croakies, Inc.*, Petitioners v. *CABLZ, Inc.* Patent Owner/IPR 2014-01240 U.S. Pat. No. 8,366,268 Issue Date: Feb. 5, 2013 Title: Eye Wear Retention Device; Dec. 18, 2014, pp. 1-2.
Bird, Joseph S. III "Patent Owner's Preliminary Response to Petition Under 35 U.S.C. 313 and 37 CFR 42.107—Exhibit 2052" United States Patent and Trademark Office/Before the Patent Trial and Appeal Board/ *Chums, Inc., and Croakies, Inc.*, Petitioners v. *CABLZ, Inc.* Patent Owner/IPR 2014-01240 U.S. Pat. No. 8,366,268 Issue Date: Feb. 5, 2013 Title: Eye Wear Retention Device; Dec. 18, 2014, pp. 1-2.
Bird, Joseph S. III "Patent Owner's Preliminary Response to Petition Under 35 U.S.C. 313 and 37 CFR 42.107—Exhibit 2059" United States Patent and Trademark Office/Before the Patent Trial and Appeal Board/ *Chums, Inc., and Croakies, Inc.*, Petitioners v. *CABLZ, Inc.* Patent Owner/IPR 2014-01240 U.S. Pat. No. 8,366,268 Issue Date: Feb. 5, 2013 Title: Eye Wear Retention Device; Dec. 18, 2014, pp. 1-53.
Bird, Joseph S. III "Patent Owner's Preliminary Response to Petition Under 35 U.S.C. 313 and 37 CFR 42.107—Exhibit 2060" United States Patent and Trademark Office/Before the Patent Trial and Appeal Board/ *Chums, Inc., and Croakies, Inc.*, Petitioners v. *CABLZ, Inc.* Patent Owner/IPR 2014-01240 U.S. Pat. No. 8,366,268 Issue Date: Feb. 5, 2013 Title: Eye Wear Retention Device; Dec. 18, 2014, pp. 1-8.
Higgs, Daniel C. "Petition for Inter Partes Review of U.S. Pat. No. 8,366,268 Under 35 U.S.C. 311-319 and 37 CFR 42" United States Patent and Trademark Office/Before the Patent Trial and Appeal Board/*Chums, Inc., and Croakies, Inc.*, Petitioners v. *CABLZ, Inc.* Patent Owner/IPR 2015-00602 U.S. Pat. No. 8,366,268; Filed Jan. 22, 2015, pp. 1-66.
Higgs, Daniel C. "Petition for Inter Partes Review of U.S. Pat. No. 8,366,268 Under 35 U.S.C. 311-319 and 37 CFR 42—Exhibit 1001" United States Patent and Trademark Office/Before the Patent Trial and Appeal Board/*Chums, Inc., and Croakies, Inc.*, Petitioners v. *CABLZ, Inc.* Patent Owner/IPR 2015-00602 U.S. Pat. No. 8,366,268; Filed Jan. 22, 2015, pp. 1-9.
Higgs, Daniel C. "Petition for Inter Partes Review of U.S. Pat. No. 8,366,268 Under 35 U.S.C. 311-319 and 37 CFR 42—Exhibit

(56) References Cited

OTHER PUBLICATIONS

1002" United States Patent and Trademark Office/Before the Patent Trial and Appeal Board/*Chums, Inc., and Croakies, Inc.*, Petitioners v. *CABLZ, Inc.* Patent Owner/IPR 2015-00602 U.S. Pat. No. 8,366,268; Filed Jan. 22, 2015, pp. 1-5.

Higgs, Daniel C. "Petition for Inter Partes Review of U.S. Pat. No. 8,366,268 Under 35 U.S.C. 311-319 and 37 CFR 42—Exhibit 1003" United States Patent and Trademark Office/Before the Patent Trial and Appeal Board/*Chums, Inc., and Croakies, Inc.*, Petitioners v. *CABLZ, Inc.* Patent Owner/IPR 2015-00602 U.S. Pat. No. 8,366,268; Filed Jan. 22, 2015, pp. 1-11.

Higgs, Daniel C. "Petition for Inter Partes Review of U.S. Pat. No. 8,366,268 Under 35 U.S.C. 311-319 and 37 CFR 42—Exhibit 1004" United States Patent and Trademark Office/Before the Patent Trial and Appeal Board/*Chums, Inc., and Croakies, Inc.*, Petitioners v. *CABLZ, Inc.* Patent Owner/IPR 2015-00602 U.S. Pat. No. 8,366,268; Filed Jan. 22, 2015, pp. 1-16.

Higgs, Daniel C. "Petition for Inter Partes Review of U.S. Pat. No. 8,366,268 Under 35 U.S.C. 311-319 and 37 CFR 42—Exhibit 1005" United States Patent and Trademark Office/Before the Patent Trial and Appeal Board/*Chums, Inc., and Croakies, Inc.*, Petitioners v. *CABLZ, Inc.* Patent Owner/IPR 2015-00602 U.S. Pat. No. 8,366,268; Filed Jan. 22, 2015, pp. 1-3.

Higgs, Daniel C. "Petition for Inter Partes Review of U.S. Pat. No. 8,366,268 Under 35 U.S.C. 311-319 and 37 CFR 42—Exhibit 1007" United States Patent and Trademark Office/Before the Patent Trial and Appeal Board/*Chums, Inc., and Croakies, Inc.*, Petitioners v. *CABLZ, Inc.* Patent Owner/IPR 2015-00602 U.S. Pat. No. 8,366,268; Filed Jan. 22, 2015, pp. 1-3.

Higgs, Daniel C. "Petition for Inter Partes Review of U.S. Pat. No. 8,366,268 Under 35 U.S.C. 311-319 and 37 CFR 42—Exhibit 1008" United States Patent and Trademark Office/Before the Patent Trial and Appeal Board/*Chums, Inc., and Croakies, Inc.*, Petitioners v. *CABLZ, Inc.* Patent Owner/IPR 2015-00602 U.S. Pat. No. 8,366,268; Filed Jan. 22, 2015, pp. 1-14.

Higgs, Daniel C. "Petition for Inter Partes Review of U.S. Pat. No. 8,366,268 Under 35 U.S.C. 311-319 and 37 CFR 42—Exhibit 1009" United States Patent and Trademark Office/Before the Patent Trial and Appeal Board/*Chums, Inc., and Croakies, Inc.*, Petitioners v. *CABLZ, Inc.* Patent Owner/IPR 2015-00602 U.S. Pat. No. 8,366,268; Filed Jan. 22, 2015, pp. 1-9.

Higgs, Daniel C. "Petition for Inter Partes Review of U.S. Pat. No. 8,366,268 Under 35 U.S.C. 311-319 and 37 CFR 42—Exhibit 1010" United States Patent and Trademark Office/Before the Patent Trial and Appeal Board/*Chums, Inc., and Croakies, Inc.*, Petitioners v. *CABLZ, Inc.* Patent Owner/IPR 2015-00602 U.S. Pat. No. 8,366,268; Filed Jan. 22, 2015, pp. 1-3.

Higgs, Daniel C. "Petition for Inter Partes Review of U.S. Pat. No. 8,366,268 Under 35 U.S.C. 311-319 and 37 CFR 42—Exhibit 1011" United States Patent and Trademark Office/Before the Patent Trial and Appeal Board/*Chums, Inc., and Croakies, Inc.*, Petitioners v. *CABLZ, Inc.* Patent Owner/IPR 2015-00602 U.S. Pat. No. 8,366,268; Filed Jan. 22, 2015, pp. 1-3.

Higgs, Daniel C. "Petition for Inter Partes Review of U.S. Pat. No. 8,366,268 Under 35 U.S.C. 311-319 and 37 CFR 42—Exhibit 1012" United States Patent and Trademark Office/Before the Patent Trial and Appeal Board/*Chums, Inc., and Croakies, Inc.*, Petitioners v. *CABLZ, Inc.* Patent Owner/IPR 2015-00602 U.S. Pat. No. 8,366,268; Filed Jan. 22, 2015, pp. 1-2.

Higgs, Daniel C. "Petition for Inter Partes Review of U.S. Pat. No. 8,366,268 Under 35 U.S.C. 311-319 and 37 CFR 42—Exhibit 1013" United States Patent and Trademark Office/Before the Patent Trial and Appeal Board/*Chums, Inc., and Croakies, Inc.*, Petitioners v. *CABLZ, Inc.* Patent Owner/IPR 2015-00602 U.S. Pat. No. 8,366,268; Filed Jan. 22, 2015, pp. 1-263.

Higgs, Daniel C. "Petition for Inter Partes Review of U.S. Pat. No. 8,366,268 Under 35 U.S.C. 311-319 and 37 CFR 42—Exhibit 1014" United States Patent and Trademark Office/Before the Patent Trial and Appeal Board/*Chums, Inc., and Croakies, Inc.*, Petitioners v. *CABLZ, Inc.* Patent Owner/IPR 2015-00602 U.S. Pat. No. 8,366,268; Filed Jan. 22, 2015, pp. 1-4.

Higgs, Daniel C. "Petition for Inter Partes Review of U.S. Pat. No. 8,366,268 Under 35 U.S.C. 311-319 and 37 CFR 42—Exhibit 1015" United States Patent and Trademark Office/Before the Patent Trial and Appeal Board/*Chums, Inc., and Croakies, Inc.*, Petitioners v. *CABLZ, Inc.* Patent Owner/IPR 2015-00602 U.S. Pat. No. 8,366,268; Filed Jan. 22, 2015, pp. 1-4.

Higgs, Daniel C. "Petition for Inter Partes Review of U.S. Pat. No. 8,366,268 Under 35 U.S.C. 311-319 and 37 CFR 42—Exhibit 1016" United States Patent and Trademark Office/Before the Patent Trial and Appeal Board/*Chums, Inc., and Croakies, Inc.*, Petitioners v. *CABLZ, Inc.* Patent Owner/IPR 2015-00602 U.S. Pat. No. 8,366,268; Filed Jan. 22, 2015, pp. 1-5.

Higgs, Daniel C. "Petition for Inter Partes Review of U.S. Pat. No. 8,366,268 Under 35 U.S.C. 311-319 and 37 CFR 42—Exhibit 1017" United States Patent and Trademark Office/Before the Patent Trial and Appeal Board/*Chums, Inc., and Croakies, Inc.*, Petitioners v. *CABLZ, Inc.* Patent Owner/IPR 2015-00602 U.S. Pat. No. 8,366,268; Filed Jan. 22, 2015, pp. 1-7.

Higgs, Daniel C. "Petition for Inter Partes Review of U.S. Pat. No. 8,366,268 Under 35 U.S.C. 311-319 and 37 CFR 42—Exhibit 1018" United States Patent and Trademark Office/Before the Patent Trial and Appeal Board/*Chums, Inc., and Croakies, Inc.*, Petitioners v. *CABLZ, Inc.* Patent Owner/IPR 2015-00602 U.S. Pat. No. 8,366,268; Filed Jan. 22, 2015, pp. 1-64.

Higgs, Daniel C. "Petition for Inter Partes Review of U.S. Pat. No. 8,366,268 Under 35 U.S.C. 311-319 and 37 CFR 42—Exhibit 1019" United States Patent and Trademark Office/Before the Patent Trial and Appeal Board/*Chums, Inc., and Croakies, Inc.*, Petitioners v. *CABLZ, Inc.* Patent Owner/IPR 2015-00602 U.S. Pat. No. 8,366,268; Filed Jan. 22, 2015, p. 1.

Higgs, Daniel C. "Petition for Inter Partes Review of U.S. Pat. No. 8,366,268 Under 35 U.S.C. 311-319 and 37 CFR 42—Exhibit 1020" United States Patent and Trademark Office/Before the Patent Trial and Appeal Board/*Chums, Inc., and Croakies, Inc.*, Petitioners v. *CABLZ, Inc.* Patent Owner/IPR 2015-00602 U.S. Pat. No. 8,366,268; Filed Jan. 22, 2015, pp. 1-212.

Higgs, Daniel C. "Petition for Inter Partes Review of U.S. Pat. No. 8,366,268 Under 35 U.S.C. 311-319 and 37 CFR 42—Exhibit 1021" United States Patent and Trademark Office/Before the Patent Trial and Appeal Board/*Chums, Inc., and Croakies, Inc.*, Petitioners v. *CABLZ, Inc.* Patent Owner/IPR 2015-00602 U.S. Pat. No. 8,366,268; Filed Jan. 22, 2015, pp. 1-163.

Higgs, Daniel C. "Petition for Inter Partes Review of U.S. Pat. No. 8,366,268 Under 35 U.S.C. 311-319 and 37 CFR 42—Exhibit 1022" United States Patent and Trademark Office/Before the Patent Trial and Appeal Board/*Chums, Inc., and Croakies, Inc.*, Petitioners v. *CABLZ, Inc.* Patent Owner/IPR 2015-00602 U.S. Pat. No. 8,366,268; Filed Jan. 22, 2015, pp. 1-9.

Higgs, Daniel C. "Petition for Inter Partes Review of U.S. Pat. No. 8,366,268 Under 35 U.S.C. 311-319 and 37 CFR 42—Exhibit 1025" United States Patent and Trademark Office/Before the Patent Trial and Appeal Board/*Chums, Inc., and Croakies, Inc.*, Petitioners v. *CABLZ, Inc.* Patent Owner/IPR 2015-00602 U.S. Pat. No. 8,366,268; Filed Jan. 22, 2015, pp. 1-30.

Higgs, Daniel C. "Petition for Inter Partes Review of U.S. Pat. No. 8,366,268 Under 35 U.S.C. 311-319 and 37 CFR 42—Exhibit 1026" United States Patent and Trademark Office/Before the Patent Trial and Appeal Board/*Chums, Inc., and Croakies, Inc.*, Petitioners v. *CABLZ, Inc.* Patent Owner/IPR 2015-00602 U.S. Pat. No. 8,366,268; Filed Jan. 22, 2015, pp. 1-97.

Higgs, Daniel C. "Petition for Inter Partes Review of U.S. Pat. No. 8,366,268 Under 35 U.S.C. 311-319 and 37 CFR 42—Exhibit 1027" United States Patent and Trademark Office/Before the Patent Trial and Appeal Board/*Chums, Inc., and Croakies, Inc.*, Petitioners v. *CABLZ, Inc.* Patent Owner/IPR 2015-00602 U.S. Pat. No. 8,366,268; Filed Jan. 22, 2015, pp. 1-7.

Kalan, Administrative Patent Judge "DECISION Institution of Inter Partes Review 37 C.F.R. 42.108" United States Patent and Trademark Office/Before the Patent Trial and Appeal Board/*Chums, Inc.,*

(56) References Cited

OTHER PUBLICATIONS

*and Croakies, Inc.*, Petitioners v. *CABLZ, Inc.* Patent Owner/Case IPR 2014-01240 U.S. Pat. No. 8,366,268 B2; Paper 10; Issued Feb. 10, 2015; pp. 1-19.
Kalan, Administrative Patent Judge "Final Written Decision 35 U.S.C. 318(a) and 37 C.F.R. 42.73" United States Patent and Trademark Office/Before the Patent Trial and Appeal Board/*Chums, Inc., and Croakies, Inc.*, Petitioners v. *CABLZ, Inc.* Patent Owner/Case IPR 2014-01240 U.S. Pat. No. 8,366,268 B2; Paper No. 43; Issued Feb. 8, 2016; pp. 1-36.
Bill Monroe, Outdoor folks don't use trendy glasses-holders, E4, Jul. 4,b 1991, The Oregonian, Oregon, US.†

\* cited by examiner
† cited by third party

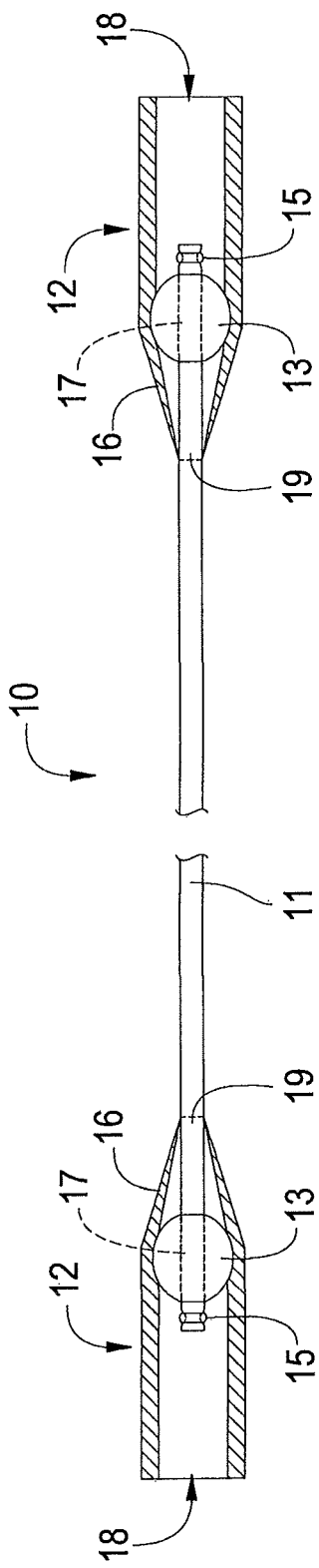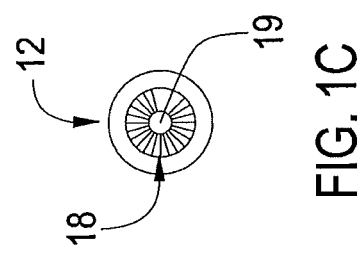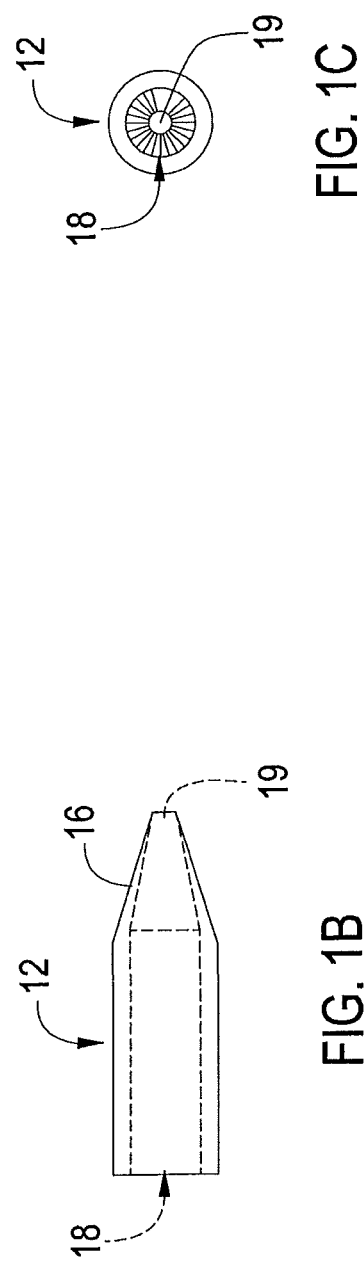

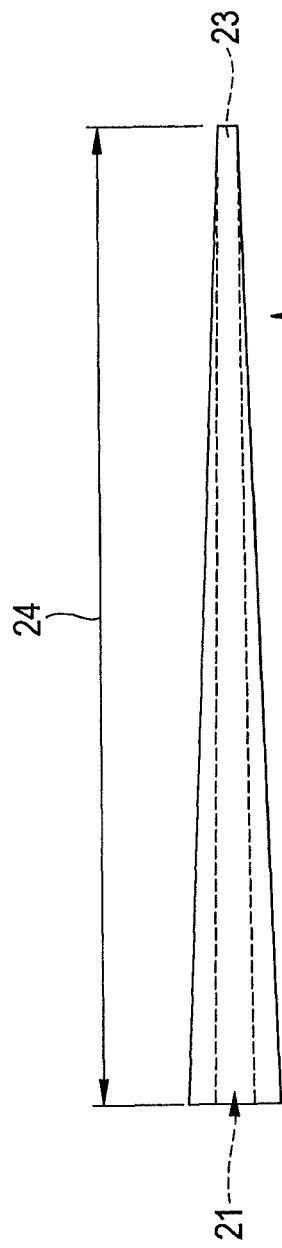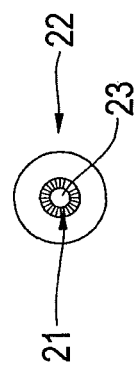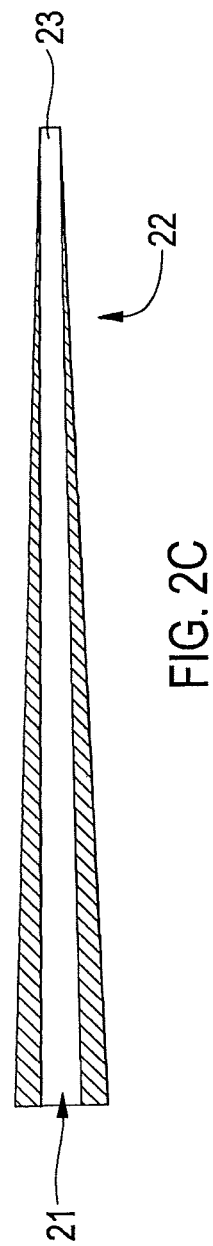
FIG. 2A
FIG. 2B
FIG. 2C

EYEWEAR RETENTION DEVICE

CROSS-REFERENCE TO RELATED APPLICATIONS

This application is a continuation of U.S. patent application Ser. No. 13/346,492, filed on Jan. 9, 2012, now abandoned. U.S. patent application Ser. No. 13/346,492 is a continuation of U.S. patent application Ser. No. 12/640,872 filed Dec. 17, 2009, which issued as U.S. Pat. No. 8,092,009, on Jan. 10, 2012. U.S. Pat. No. 8,092,009 was a continuation of U.S. patent application Ser. No. 29/336,727, filed May 7, 2009, which is abandoned. U.S. patent application Ser. No. 13/346,492, filed on Jan. 9, 2012, which is currently pending, is also a continuation of U.S. patent application Ser. No. 12/991,668 filed on Nov. 8, 2010, and which issued as U.S. Pat. No. 8,366,268, on Feb. 5, 2013. U.S. Pat. No. 8,366,268 was a national stage entry of International Application PCT/US2009/043156, filed on May 7, 2009, and which is currently expired. PCT/US2009/043156 cited the priority of U.S. patent application Ser. No. 12/142,323, filed Jun. 19, 2008, and which issued as U.S. Pat. No. 7,467,867 on Dec. 23, 2008, which cited for priority provisional U.S. patent application 61/051,539, filed on May 8, 2008. PCT/US2009/043156 also cited the priority of U.S. provisional patent application 61/051,539, filed on May 8, 2008.

FIELD OF INVENTION

The present invention relates generally to devices that retain eyewear on a user. In greater particularity the present invention relates to eyewear retainers that extend around rear of a wearer's head and upper neck.

BACKGROUND OF THE INVENTION

For many decades, probably longer, eyewear users have attached strings, cloth-based retainers, lightweight chains, and small ropes to eyeglasses to loosely retain them upon a wearer's upper torso when not positioned upon the wearer's head. Several decades ago, "Croakies" were introduced which are essentially neoprene retainer straps having a tubular portion into which eyeglass temples slip and a rear flat portion that extends around the rear of a user's head.

Croakies immediately became popular with skiers, fisherman, and hunters who utilize polarized sunglasses and strongly tinted lenses to provide protection from intense glare and reflected light off water, ice, and snow, and other reflective surfaces in brilliant sunlight. Other types of lenses have also developed in popular culture to provide different types of tinting and appearances, and protective strategies from glare and the sun's damaging UV light have arisen. In response, a wide variety of colors and patterns have been introduced for Croakies and other of the aforementioned retainers.

However, with the advent of more stylized eyeglasses, and especially the darker tinted glass and plastic (e.g. polycarbonate) lenses, especially in non-prescription type sunglass lenses, wearer's are more frequently required to dismount their glasses in order to read close-up materials or inspect materials that are viewed in relatively low-light conditions. For example, it is quite common for a fishermen, skippers, or first mate deckhands to discard their glasses when going underneath the top deck of a boat to retrieve fishing tackle, read charts, or view other navigational aids during bright sunlight hours in order that they may be able to see the items they are utilizing. Hence, Croakies, and other types of retained devices have become popular for outdoorsmen and sportsmen alike seeking to provide the safety and proximity retention of their glasses while providing the flexibility to discard them quickly and utilize their eyes in relatively lowlight conditions.

Unfortunately, Croakies and other types of eyewear retaining devices place a burden upon the wearer in that the older retention devices lay directly against the back of the neck or upper back portion, or around the collar of a shirt. Such locations are inconvenient because the retention device itself becomes potentially ensnared in the collar and/or buttons of the wearer's vestment which might hinder the re-application or the re-mounting of the glasses over the wearer's eyes. Further, for collarless vestments and similar, or even for a shirtless individual, the retention lanyards whether chains, string, or neoprene based retainers like Croakies, become coated with sweat, suntan lotion, protective emollients, and other types of debris on the upper torso of an individual. Such soiling makes the retention item unsightly and unattractive, thereby defeating the esthetic appeal that some of today's expensive eyeglasses exhibit. Over time, corrosion from salt and other types of chemicals on the outer layer of the skin can even corrode or diminish the retention effectiveness of the retention device, and also cause discoloration and fading of the retention device's colors and patterns.

Hence, what is needed is an eyeglass retention device that maintains the full utility of the retention objective for eyewear, while avoiding all of the difficulties of past eyewear retention devices.

SUMMARY OF INVENTION

An eyewear retention device is disclosed that includes a length of resilient cord, such as cabling having a smooth plastic outer sheath, and terminating at each end in a tapered, rubberized retention tubing, and also having retention end grommets molded against the ends of the cabling to prevent the slipping off of the retention tubing.

BRIEF DESCRIPTION OF THE DRAWINGS

An eyewear retention device incorporating the features of the apparatus are depicted in the attached drawings which form a portion of the disclosure and wherein:

FIG. 1a is a elevational drawing in partial section of a preferred embodiment of the invention;

FIG. 1b is an elevational drawing of one of the retention tubes of a preferred embodiment of the invention;

FIG. 1c is an end view of one of the retention tubes;

FIG. 2a is an elevational drawing in section of a highly tapered embodiment of one of the retention tubes of the invention;

FIG. 2b is an elevational drawing of the highly tapered embodiments of one of the retention tubes of the invention;

FIG. 2c is an end view of one of the highly tapered embodiments of one of the retention tubes of the invention;

DETAILED DESCRIPTION OF THE DRAWINGS

Figure 3:
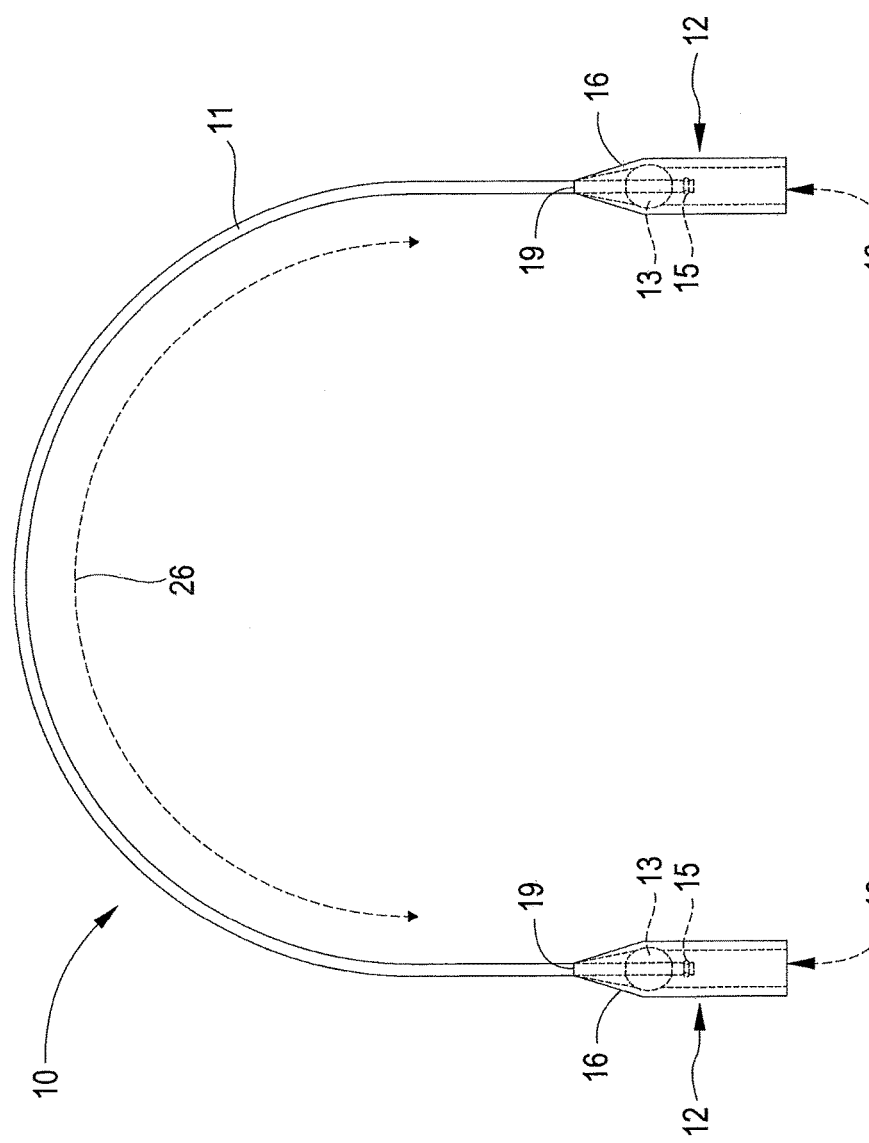
FIG. 3 is a plan view of a preferred embodiment of the invention showing the generalized semi-circular shape and retention tubing positioned against the end stop grommets.

Referring to the drawings for a better understanding of the function and structure of the invention, FIGS. 1*a-c* shows the invention 10 including a cable 11 having a tightly wound wiring structure and coated with a relatively frictionless plastic outer insulation. The cable 11 is of sufficient diameter and internal wiring resiliency such that its shape is resiliently biased toward a zero axis deflection orientation. In other words, the cable does not easily exhibit deflection memory, as one would find in a solid copper or aluminum wire of equal diameter, and resists attempts to deform the cable and maintains a linear shape in all weather conditions. Invention 10 includes retention tubes 12 at each end of cable 11. Each tube 12 includes a temple retention opening 18 having a sufficient diameter to pass over the end portions of a typically sized eyeglass temple. Retention tube 12 opening 18 is also sized to exhibit a certain friction characteristics to allow easy sliding of the retention tubing 12 onto the end portion of a typical eyeglass temple, while providing sufficient frictional qualities to avoid easy removal. Generally, the retention tubing 12 consists of flexible and resilient rubber, or like compound, and has low friction qualities on its exterior. The retention tubing 12 includes a tapered portion 16 defining a cable aperture 19 cooperatively sized to insert the end of the cable 11 while maintaining continual circumferential contact around the cabling. Once the end of the cable has been passed through aperture 19 and emerges through opening 18, a bead or ball bearing 13 is slid onto the end of cable 11 through a channel 17 traversing the center of bead 13. A crimp or grommet 15 is then applied to the cable to prevent bead 13 from slipping off cable 11. The crimp or grommet 15 is compressed using known methods to engage and permanently affix to the cable, thereby forming the stop at the end of the cable 11. The bead may be made of plastic, metal, or ceramic, and the diameter of channel 17 should be sized to allow cable 11 to freely pass through bead 13 allowing the cable 11 to rotate and translate through the bead 13. Grommet 15 may be made of any material having suitable deformation characteristics to permanently affix it to cable 11, but copper or brass is preferred due to its benign and low oxidation qualities. When affixed to the end of the cable 11, the grommet 15 bead 13 combination prevents the passage of the end of cable 11 through aperture 19. Once the bead and grommet combination has been secured to the end of cable 11, tension may be applied to cable 11 and the cable and bead-grommet combination may be carefully pulled through opening 18 to secure the bead 13 against the internal conjuncture tapering 16 and the sidewalls of retention tube 12. Upon the engagement of bead against the internal sidewalls of tapered portion 16, bead 13 will exert circumferential pressure upon the upper portion of tapered portion 16 to secure the bead 13 within the retention tube 12 and, thereby, the end portion 14 of cable 11 within the retention tubing. The assembly of the retention tube 12 and grommet-bead combination is identical for each end of cable 11.

Referring now to FIGS. 2*a-c*, one may see a second embodiment of retention tube 12. To accommodate some glasses having relatively thin temples, retention tube 22 may be reshaped to include a fully tapered conical structure from opening 21 to aperture 23. As may be seen, a hollow interior of retention tube 22 is sized into an elongated conical shape so that temples of more slender sizes may be inserted within opening 21 and slid along the interior of retention tube 22 until sufficient circumferential frictional force is applied to the end of the inserted temple to stop the progress of the temple within the hollow interior of the retention tube 22. This shape allows for varying applicability for different size temples and also provides additional retention security by increasing circumferential friction on temples inserted within the hollow interior of 22. As before, the grommet-bead combination (not shown) are affixed to the end of cable 11 and pulled through opening 21 until bead 13 engages the interior of 22 toward adjacent to aperture 23.

Referring now to FIG. 3, one may see the invention 10 conformed to a substantially semi-circular or arc shape 26. Due to the resiliency of the cable 11, retainer 10 maintains the arc shape 26 when installed upon the temples of eyeglasses.

Figure 4:
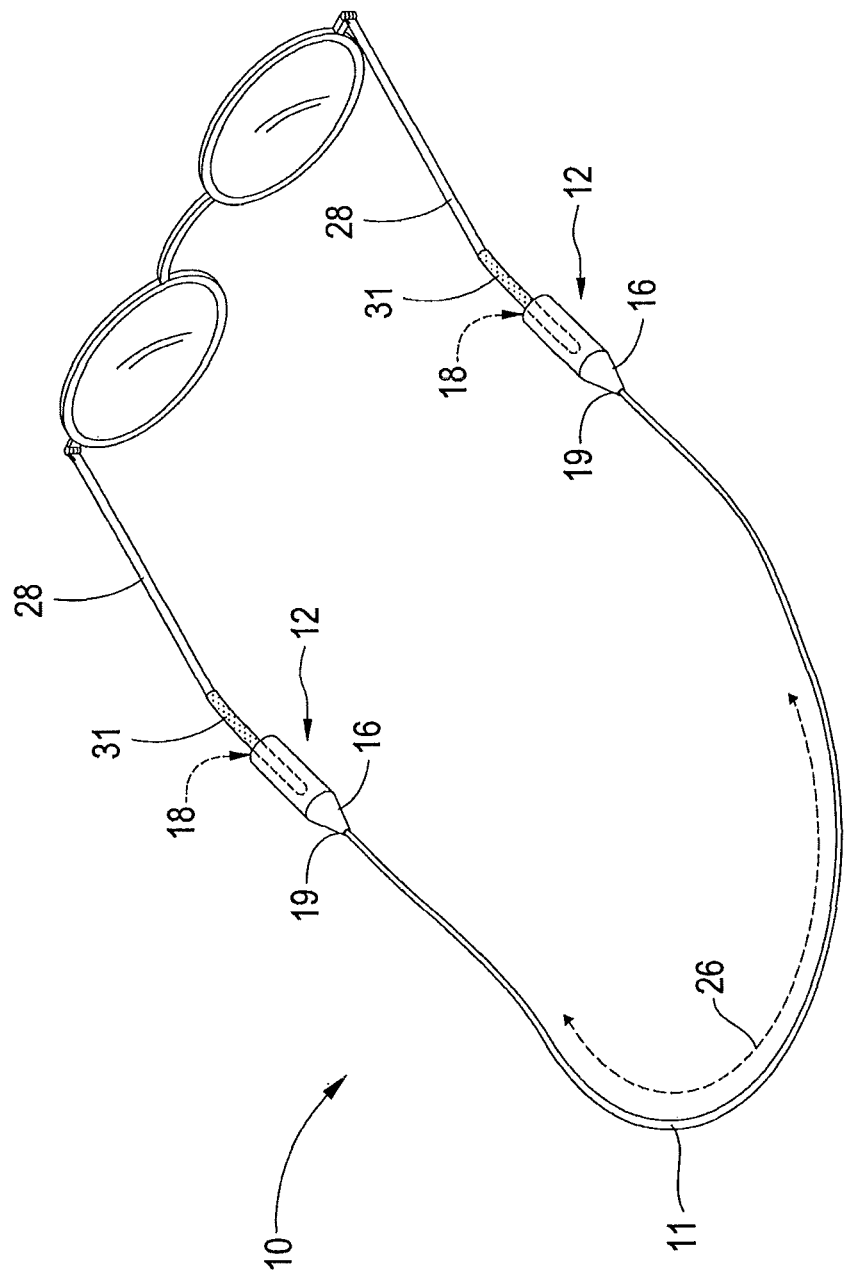
FIG. 4 is a perspective view of the invention placed upon the end portions of the temples of a typical pair of eyeglasses showing the general placement of the temples inserted within the retention tubing.
Figures 5, 6:
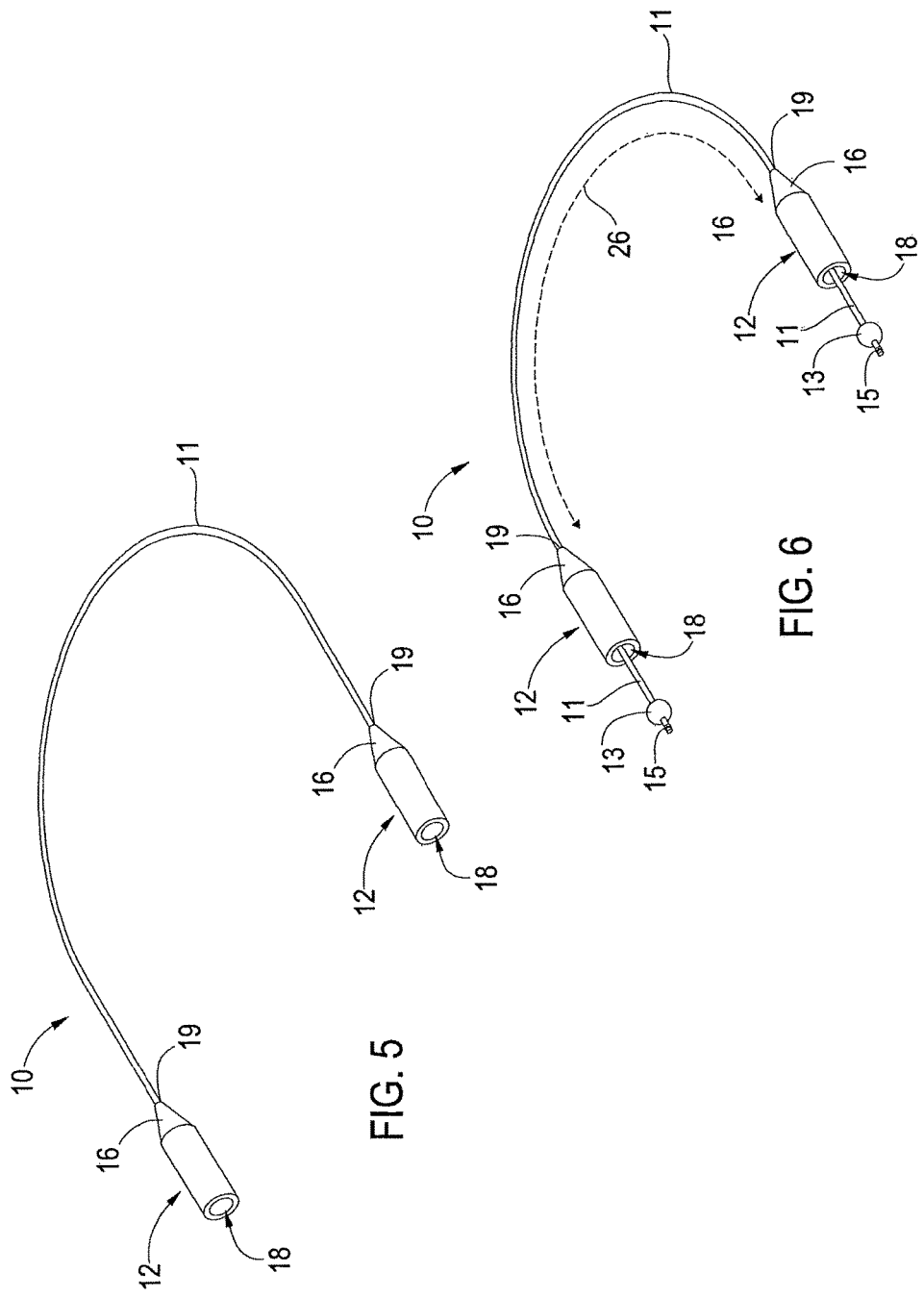
FIG. 5 is an end perspective view of a preferred embodiment of the invention; and, FIG. 6 is a plan view of the invention showing the retention tubing repositioned along the retention cable to expose the crimped end grommets that prevent the retention tubing from detaching from the retention cabling.

Referring now to FIG. 4, as shown, retention tubing 12 is inserted over end portions of the temples of the shown eyeglasses 27 until end portions of the temples 31 are fully engaged within the interior of the retention tube 12. A sufficient length of cabling 11 is provided to allow for the donning of the combination of the invention 10 and eyeglasses 27, or sunglasses as the case may be, over a wearer's head while in place, and is sized to accommodate baseball caps and similar sun visor protective head gear.

Figure 7:
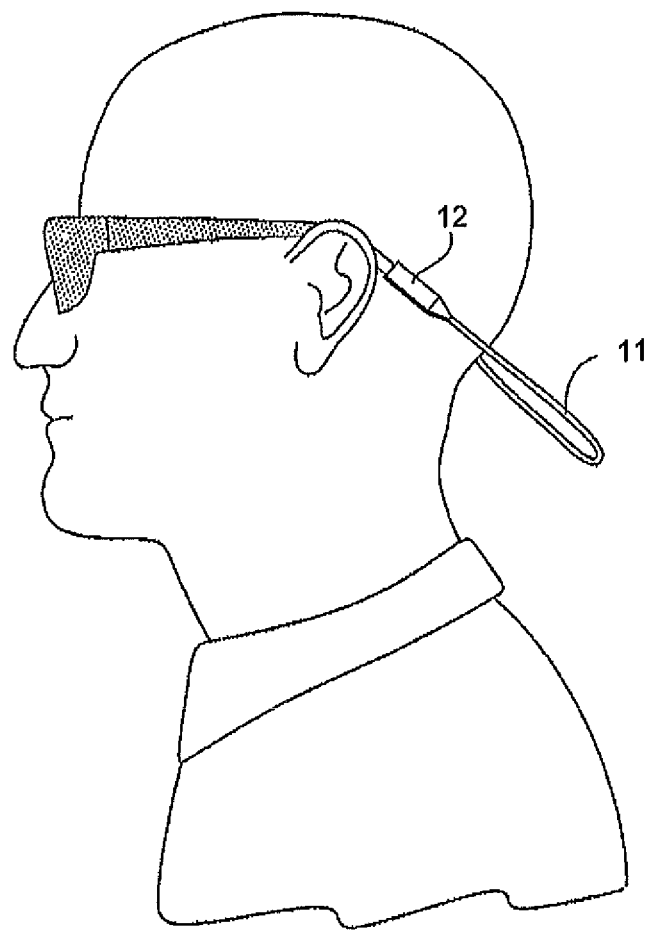
FIG. 7 is a side view of an embodiment of the invention as attached to eyeglass temples and worn over the ears of a wearer.

Importantly, the resiliency of the cabling 11 in combination with the secure structure of retention tubing 12, with its inherent resiliency, creates an internal resilience within cabling 11 such that the cable maintains an elevated arc position above a wearer's rear neck and lower head area, as shown in FIG. 7. Therefore, due to the internal resiliency of the cable, and the positioning of the tubing on the eyeglass temples, the cabling does not contact a wearer's back or collar, or other vestment worn by a user, but instead maintains a spaced position extending backwards from the user. Further, the angle of the retention tubing, and/or the conical tapered portion, may be altered to allow for the redirection of the cable portion into a superior elevated position over a wearer upper back and neck. For example, some end portions of eyeglass temples extend downward sharply over a wearer's ears. An angled retention tube allows for correction of this downward angle to normalize the direction of the cable 11 backward to maintain a suspended arc in the cable as it extends rearwardly from said user's head such that the cable does not contact the wearer or his/her vestment.

What is claimed is:

1. An eyewear retention device comprising:
   (a) two temple retainers, each having an opening for receiving an eyeglass temple, and
   (b) a cable, each end of the cable being secured to one of the temple retainers, such that when each said opening is attached to the end of an eyeglass temple and the eyeglasses are worn over the ears of a wearer, the cable does not rest upon the wearer's head and forms an arc suspended off the neck or shoulders wherein said cable rotates with respect to at least one of said temple retainers.

2. The eyewear retention device of claim 1, further comprising a grommet affixed near the end of the cable.

3. An eyewear retention device comprising:
   (a) two temple retainers, each having an opening for receiving an eyeglass temple, and (b) a cable, each end of the cable being secured to one of the temple retainers, such that when each said opening is attached to the end of an eyeglass temple and the eyeglasses are worn over the ears of a wearer, the cable does not rest upon the wearer's head and forms an arc suspended off the neck or shoulders wherein said cable rotates with respect to at least one of said temple retainers, wherein said cable passes through a channel in a member sized to securely engage with one of said temple retainers, said channel sized to allow said cable to rotate and translate therethrough, and further comprising a grommet larger than said channel affixed near the end of said cable.

4. An eyewear retention device comprising two temple retainers and a cable having two ends, each of said temple retainers comprising a front portion with an opening that may be slid over the end of an eyeglass temple and a back portion connected to one of the ends of the cable, each said temple retainer being removably attachable to the end of an eyeglass temple, such that when the temple retainers are attached to the ends of the eyeglass temples and the eyeglasses are worn over the ears of a user, the cable extends rearward from the head of the wearer and is suspended off the neck of the wearer, wherein said cable rotates with respect to said retainer.

5. An eyewear retention device comprising two temple retainers and a cable having two ends, each of said temple retainers comprising a front portion with an opening that may be slid over the end of an eyeglass temple and a back portion connected to one of the ends of the cable, each said temple retainer being removably attachable to the end of an eyeglass temple, such that when the temple retainers are attached to the ends of the eyeglass temples and the eyeglasses are worn over the ears of a user, the cable extends rearward from the head of the wearer and is suspended off the neck of the wearer, wherein said cable is secured to said temple retainer by passing through a channel in a member sized to engage with said temple retainer, said channel sized to allow said cable to rotate and translate therethrough, and further comprising a grommet larger than said channel affixed near the end of said cable.

6. The eyewear retention device of claim 5, wherein said member is a bead or ball bearing.

7. The eyewear retention device of claim 5, further comprising a grommet larger than said channel affixed near the end of said cable.

* * * * *